United States Patent
Park

(12) 
(10) Patent No.: US 7,100,942 B2
(45) Date of Patent: Sep. 5, 2006

(54) AIR BAG DOOR STRUCTURE FOR AN AUTOMOBILE

(75) Inventor: Jang-yeol Park, Yongin-shi (KR)

(73) Assignee: Hyundai Mobis, Seoul (KR)

( * ) Notice: Subject to any disclaimer, the term of this patent is extended or adjusted under 35 U.S.C. 154(b) by 290 days.

(21) Appl. No.: 10/713,251

(22) Filed: Nov. 17, 2003

(65) Prior Publication Data

US 2005/0082796 A1   Apr. 21, 2005

(30) Foreign Application Priority Data

Oct. 17, 2003   (KR)   ...................... 10-2003-0072654

(51) Int. Cl.
*B60R 21/20* (2006.01)
(52) U.S. Cl. .................................. 280/728.3
(58) Field of Classification Search ............. 280/728.3, 280/732, 728.2
See application file for complete search history.

(56) References Cited

U.S. PATENT DOCUMENTS

| | | | | |
|---|---|---|---|---|
| 5,280,947 A | * | 1/1994 | Cooper | .................. 280/728.3 |
| 5,451,075 A | * | 9/1995 | Parker et al. | ............. 280/728.3 |
| 5,452,913 A | * | 9/1995 | Hansen et al. | ............ 280/728.1 |
| 5,533,749 A | * | 7/1996 | Leonard et al. | ........... 280/728.3 |
| 6,942,243 B1 | * | 9/2005 | Davis et al. | .............. 280/728.3 |

FOREIGN PATENT DOCUMENTS

| | | |
|---|---|---|
| JP | 09-030360 | 2/1997 |
| JP | 11-240027 | 9/1999 |
| JP | 11-321517 | 11/1999 |

OTHER PUBLICATIONS

English Language Abstracts JP 11-240027.
English Language Abstracts JP 11-321517.
English Language Abstracts JP 09-030360.

* cited by examiner

*Primary Examiner*—Faye M. Fleming
(74) *Attorney, Agent, or Firm*—Greenblum & Bernstein, P.L.C.

(57) ABSTRACT

The skin layer provides a neat appearance since it is integrally formed with a one-piece member, and prevents foreign materials of the prior art two-piece member from being introduced into the gap. In addition, there is an advantage of reducing the manufacturing costs since the mold for machining the skin layer is reduced, and a foam tape for fixing the inner and the outer skin layers is not used.

4 Claims, 5 Drawing Sheets

AIR BAG DOOR STRUCTURE FOR AN AUTOMOBILE

RELATED APPLICATION

The present disclosure relates to subject matter contained in Korean application No.2003-72654, filed on Oct. 17, 2003, which is herein expressly incorporated by reference its entirety.

BACKGROUND OF THE INVENTION

1. Field of the Invention

The present invention relates to an air bag door for an automobile, and more particularly, to an air bag door for an automobile capable of preventing damage to a cushion upon development of the air bag door and injury to a worker during assembling operation by forming a part for reinforcing its strength by bending an edge portion of the air bag door, and forming a hemming part folded to one side at a flange extending from the reinforcing part to an end part.

2. Description of the Related Art

Generally, an air bag for an automobile is a safety auxiliary device for preventing injury from occurring, due to a collision with a door handle, instrument panel or front window when a driver or passengers in their seats impact in car accident.

Performance of the latest automobile has been developed and the conditions of the roads has been improved to gradually raise the driving speed of automobiles, as a result, when a head-on collision accident involving automobiles occurs, the chance of inflicting a serious injury to the driver or passenger has increased. Therefore, an air bag of an automobile has been universally installed, as a result, the safety of a driver and a passenger in the automobile has increased.

Air bags are classified as follows: an air bag for a driver installed at the handle of the driver; an air bag for an passenger installed within the instrument panel at the upper side of the glove box to protect the passenger; a side air bag expandable from the door to protect the driver and passengers; and an air bag for protecting the knees of the driver.

FIG. 1 is a view for illustrating the interior structure of a general automobile; FIG. 2 is a perspective view for illustrating the structure of a prior art air bag door; and FIG. 3 is a cross-sectional view of line A—A in FIG. 1.

The prior art air bag has a structure in that an inner skin layer 4 and an outer skin layer 6 are separated at an indication line on the instrument panel 2, with first and second skin surfaces 3 and 7 being in contact with each other.

In addition, installed at the first and the second skin surfaces 3 and 7 is a foam tape 14 for fixing the inner skin layer 4 and the outer skin layer 6 to each other.

An inner cavity of the inner skin layer 4 and the outer skin layer is filled with a foam resin 16, and an air bag door 10 is adhered and fixed to an adhering part 17 through an air bag opening 19 of a centerpiece 18 at the bottom surface of the foam resin 16.

In addition, a core 20 is inserted to the bottom surface of the centerpiece 18 with a uniform thickness, and the cushion is located at the bottom surface of the air bag door 10 in a folded state and the air bag door 10 is pulled back and the foam resin 16 is incised while the cushion is expanded by an explosion device. Continuously, the inner skin layer 4 fixed by the foam tape 14 is incised with respect to the outer skin layer 6 to absorb an impact and prevent a collision accident as the cushion expands into the passenger.

However, the prior art air bag structure has a problem of lowering an external appearance quality since the inner skin layer 4 for dividing the air bag door 10 in the instrument panel 2 forms the indication line 5 incised with respect to the outer skin layer 6.

Further, there is a disadvantage in that protrusion heights between the inner skin layer 4 and the outer skin layer 6 become different as well as a gap in the indication line 5 is widened due to deformation between the inner skin layer 4 and the outer skin layer 6.

In addition, as the air bag door is formed flat, when the air bag door 10 is pulled back, the strength of the air bag door 10 can not be sufficiently maintained, and since the edge of the air bag door is adhered to the adhering part 17 of the centerpiece 18 in a sharp state, it causes the problem of inflicting injury to a worker's body.

SUMMARY OF THE INVENTION

To solve the above-mentioned problems, an object of the present invention is to provide an air bag door structure for an automobile capable of preventing damage of a cushion upon the assembly of the air bag door and injury of a worker upon an assembly operation by forming a reinforcing part by bending an edge portion of the air bag door, and forming a hemming part folded onto one side at a flange part extending from the reinforcing part to an end part.

To accomplish the above-mentioned objects, the present invention provides an air bag door structure for an automobile, comprising: a skin layer for forming a surface of an instrument panel to form an incision groove for incising the bottom surface; a foam resin polymerized at the rear surface of the skin layer; a centerpiece, at which a core is in contact with the bottom surface and installed, provided with an air bag opening at an inner side of the foam resin; and an air bag door mounted in the air bag opening of the centerpiece, characterized in that a flange portion bent toward the incision groove of the skin layer is formed at an end portion of the air bag door mounted on the air bag opening of the centerpiece, and hemming part folded by bending the end portion of the flange portion to one side.

Preferably, the hemming part is formed by bending it to the inside of the air bag door by a pressing process.

Preferably, the air bag door is formed with a reinforcing part for reinforcing strength of the air bag door since the height of the air bag door becomes larger due to the generation of a stepped stage as it goes toward a more central portion than where it is mounted on the air bag opening of the centerpiece.

Preferably, the bent length of the hemming part has a range of 2 to 6 mm, most preferably, a range of 3 to 5 mm.

BRIEF DESCRIPTION OF DRAWINGS

These and other features, aspects, and advantages of preferred embodiments of the present invention will be more fully described in the following detailed description, taken accompanying drawings. In the drawings.

DESCRIPTION OF THE PREFERRED EMBODIMENT

Hereinafter, the present invention will be apparent from the detailed description in conjunction with the accompanying drawings.

Figure 1:
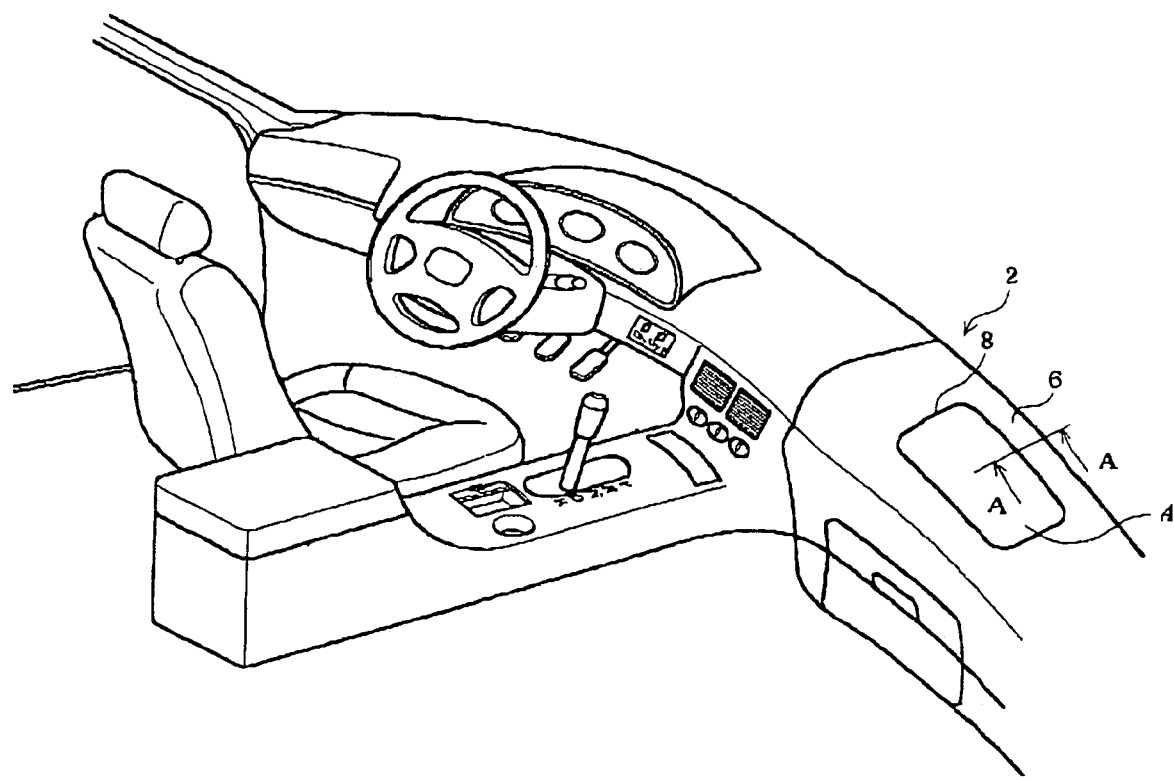
FIG. 1 is a view for illustrating an inner structure of a general automobile.
Figure 2:
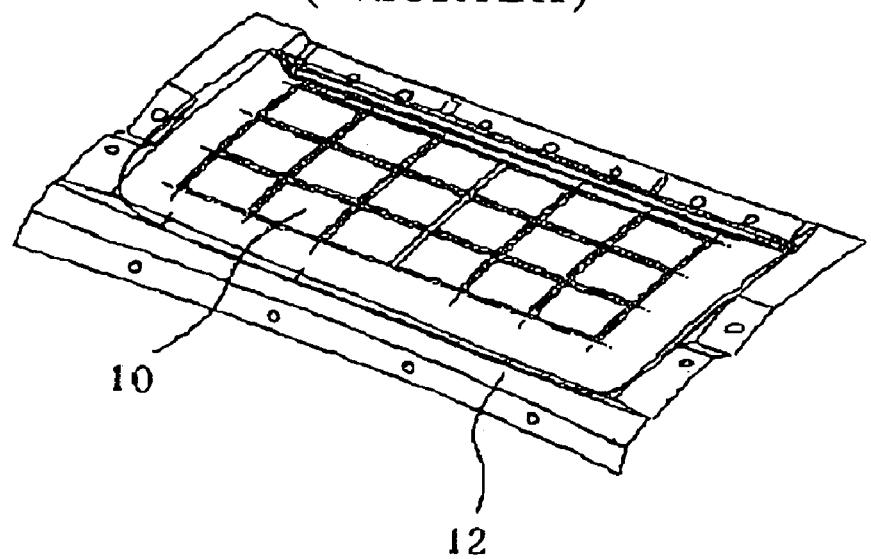
FIG. 2 is a perspective view for illustrating a prior art air bag door structure.
Figure 3:
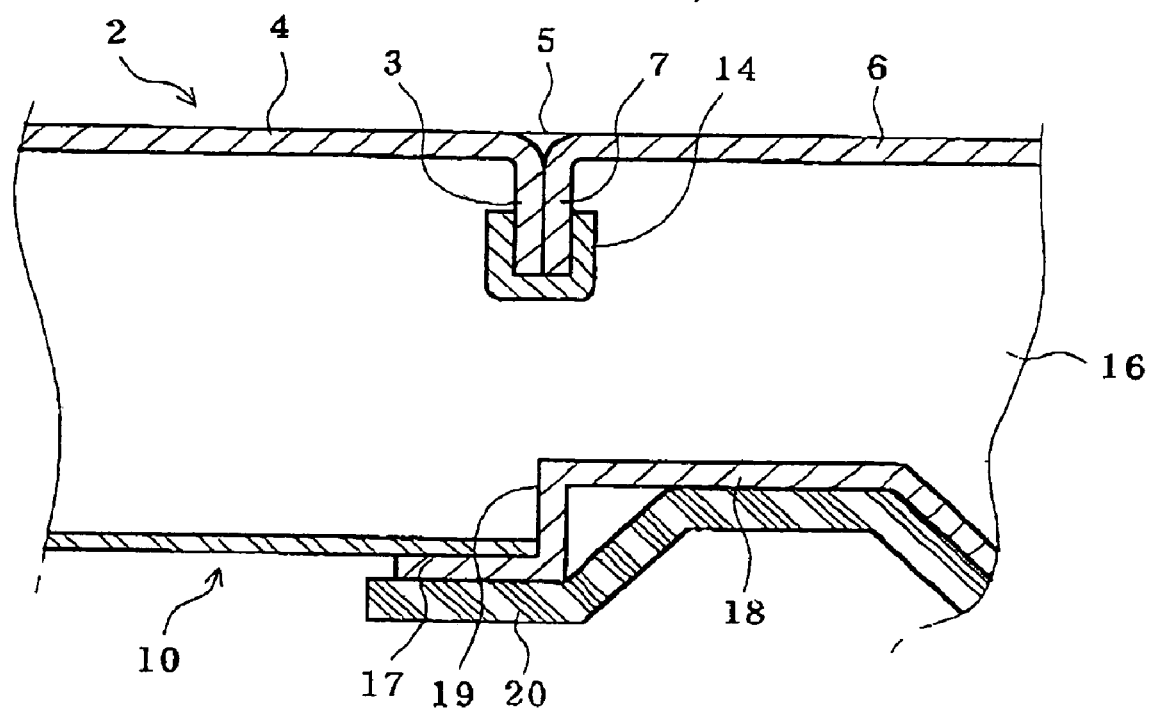
FIG. 3 is a cross-sectional view of line A—A in FIG. 1.
Figure 4:
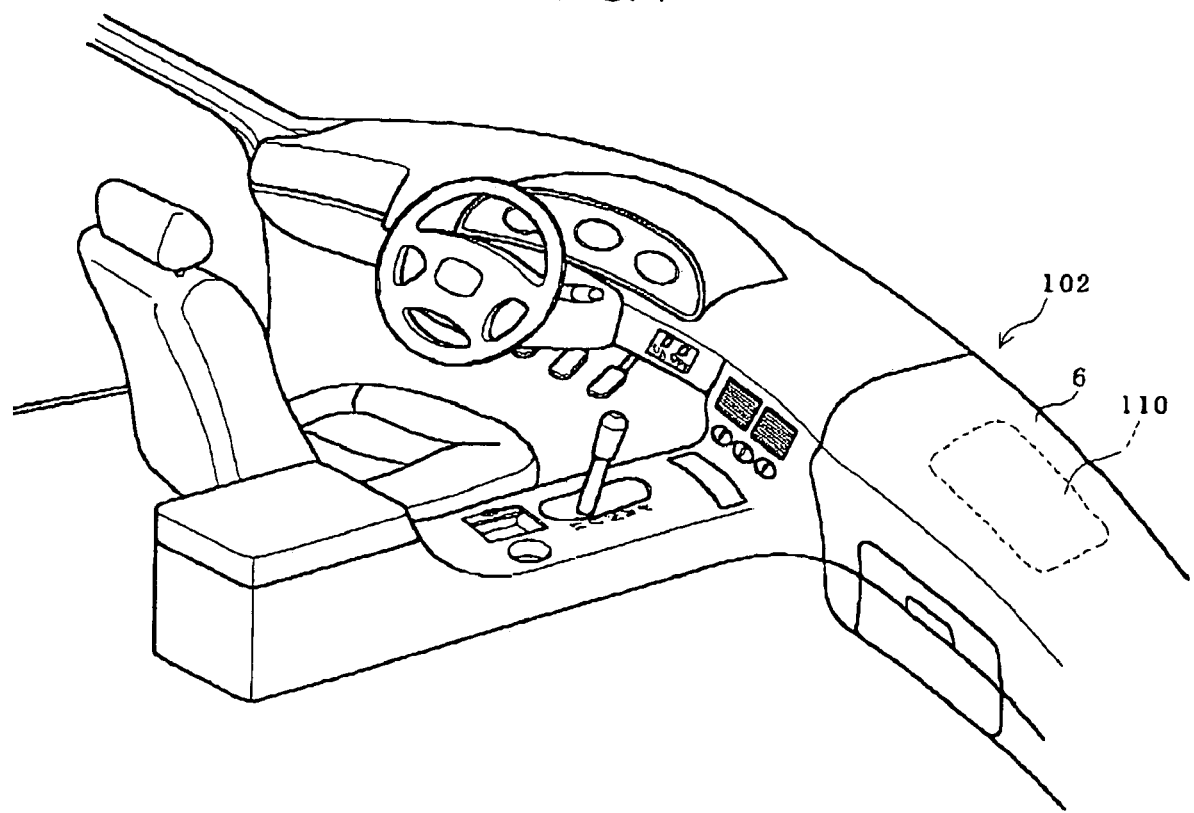
FIG. 4 is a view for illustrating the inner structure of an automobile, in which an air bag door in accordance with the present invention is installed.
Figure 5:
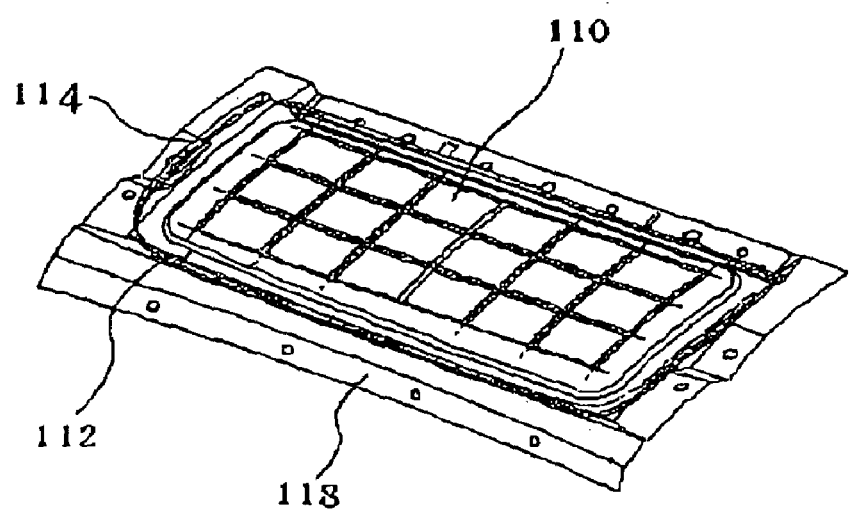
FIG. 5 is a view for illustrating an air bag door in accordance with the present invention.
Figure 6:
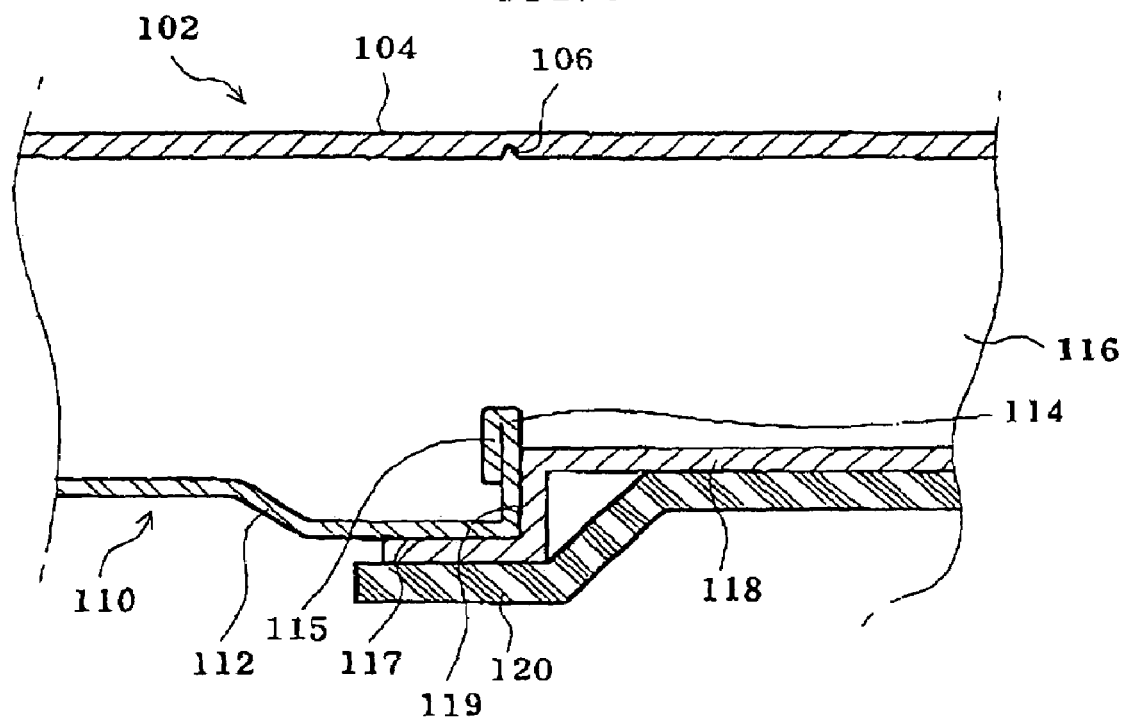
FIG. 6 is a cross-sectional view of an assembled state of an air bag door in accordance with the present invention.
Figure 7:
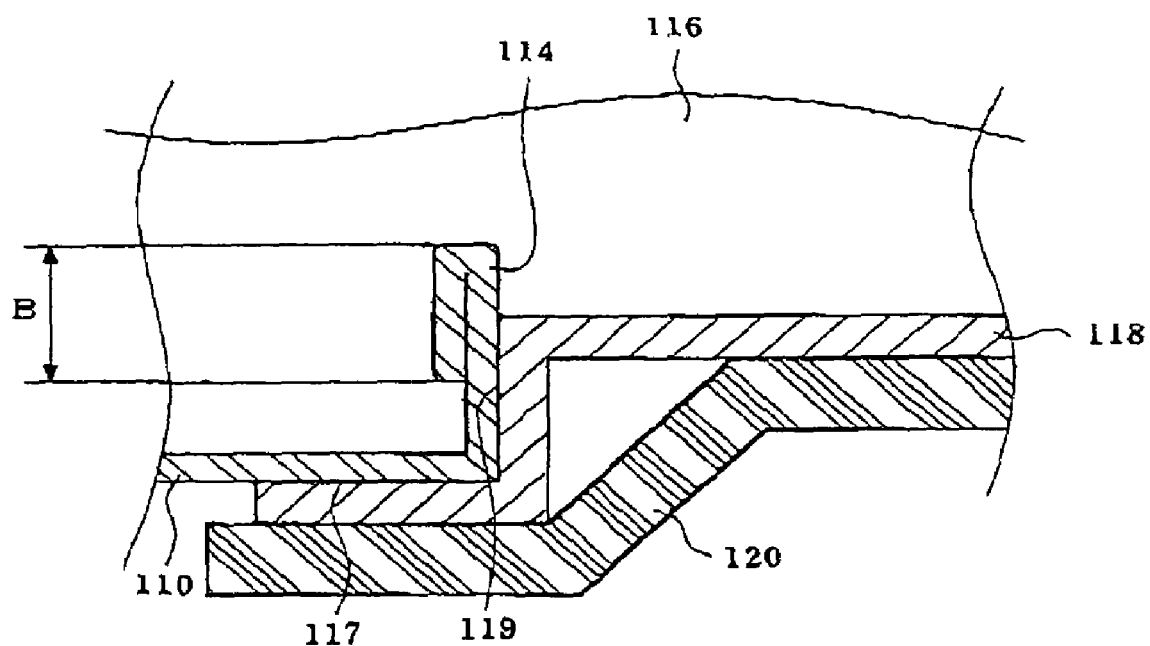
FIG. 7 is an enlarged view of a hemming part of an air bag door in accordance with the present invention.

FIG. 4 is a view for illustrating an inner structure of an automobile, which an air bag door in accordance with the present invention is installed; FIG. 5 is a view for illustrating an air bag door in accordance with the present invention; FIG. 6 is a cross-sectional view of an assembled state of an air bag door in accordance with the present invention; and FIG. 7 is an enlarged view of a hemming part of an air bag door in accordance with the present invention.

The air bag door structure in accordance with the present invention is provided with a skin layer 104 for forming a surface of an instrument pane 102 and forming an incision groove 106 for incising a rear surface. The skin layer 14 is preferably made of a soft resin material such as vinyl chloride.

And, a foam resin 116 made of semi-hard urethane foam is integrally polymerized at the rear surface of the skin layer 104.

Further, an air bag opening 119 is formed at an inner side of the foam resin 116 and a centerpiece 118 is installed at the bottom surface thereof as a core 120 is contacted therewith.

In addition, the air bag door 110 mounted on the air bag opening 119 of the centerpiece 118 is polymerized and installed.

Built into the rear surface of the air bag door 110 are a cushion and an explosion device for exploding the cushion.

As shown in FIGS. 6 and 7, formed at an end portion of the air bag door 110 mounted onto the air bag opening of the centerpiece 118 are a flange part 114 folded toward the incision groove 106 of the skin layer 104, and a hemming part 115 folded by bending the end part of the flange part 114 to one side.

Further, the hemming part 115 is folded to the inner side of the air bag door 110 by a pressing process.

The air bag door 110 is formed with a reinforcing part 112 for reinforcing the strength of the air bag door 110 since the height of the air bag door 110 becomes larger due to the generation of a stepped stage as it moves toward a more central portion than where it is mounted on the air bag opening 119 of the centerpiece 118.

Preferably, a bended length of the hemming part 115 has a range of 2 to 6 mm, preferably at about 4 mm.

The hemming part 115 prevents hand injury caused by the flange part 114 of the air bag door 110, when an operator performs an air bag assembly operation.

The skin layer 104 has the feature of providing a neat appearance since it is integrally formed with a one-piece member, thus preventing foreign materials of the prior art two-piece member from being introduced into the gap.

Hereinafter, operations and effects of the present invention will be described in conjunction with the accompanying drawings.

First, considering the assembly state of the present invention, one or more incision grooves having a depth of about a half the thickness of the skin layer 104 are formed so that the incision starts at the rear surface of the soft skin layer 104.

Further, the foam resin 116 made of urethane foam is integrally polymerized at the rear surface of the skin layer 104, and the centerpiece 118 having the air bag opening 119 is polymerized at the rear surface of the foam resin 116. The centerpiece 118 is preferably made of a metal plate member.

And, the end portion of the air bag door 110 mounted on the air bag opening 119 of the centerpiece 118 forms the flange part 114 bent to the incision groove 106 of the skin layer 104, and the end portion of the flange part 114 forms the hemming part 115 folded inward by pressing it with a press.

As shown in FIG. 7, preferably, a bent length of the hemming part 115 will have a range of 2 to 6 mm, most preferably, a range of 3 to 5 mm.

Further, the air bag door 110 has an adhesive part 117 mounted on and fixed to the centerpiece 118 using an adhesive agent.

In addition, the air bag door 110 is provided with the a reinforcing part 112 having a height larger than the portion mounted on the adhering part 117 of the centerpiece 118 and formed around the entire plate member, and the reinforcing part 112 serves to reinforce the load applied to the flange part 114, in case the air bag cushion expands upon explosion of the explosion device on the rear surface of the air bag door 110.

On the other hand, when the air bag door 110 is assembled, the inward folded hemming part 115 of the flange part 114 prevents an operator from being injured even if the operator's body is contacted.

In this state, when a collision sensor detects a collision to explode the explosion device, the air bag door 110 is opened, the flange pan 114 separates the foam resin 116 to create the incision groove 106 of the skin layer 104, thereby expanding the cushion into the front face of a passenger to protect them.

Therefore, as described hereinabove, an air bag door structure for an automobile in accordance with the present invention provides useful and effective advantages of preventing damage of the cushion upon the assembly of the air bag door and injury to an operator upon an assembly operation by forming a reinforcing part for reinforcing a strength by bending an edge portion of the air bag door, and forming a hemming part folded to one side at a flange part extended from the reinforcing part to an end part.

Further, the skin layer has features for providing a neat appearance since it is integrally formed with a one-piece member, and prevents foreign materials of the prior art two-piece member from being introduced into a gap.

In addition, the present invention has an advantage in that it reduces manufacturing costs since the mold for making the skin layer is reduced, and a foam tape for fixing the inner and the outer skin layers is not used.

While this invention has been described in connection with what is presently considered to be the most practical and preferred embodiment, it is to be understood that the invention is not limited to the disclosed embodiment, but on the contrary, it is intended to cover various modification within the spirit and scope of the appended claims.

What is claimed is:

1. An air bag structure for an automobile, comprising: a skin layer providing a surface of an instrument panel and having an incision groove provided at a bottom surface of the skin layer; a foam resin provided at the rear surface of the skin layer; a center piece provided at an inner side of the foam resin and having an airbag opening, at which a core contacts the bottom surface of the center piece; and an air bag door mounted in the air bag opening of the center piece, wherein a flange portion extends toward the incision groove of the skin layer and is provided at an end portion of the air bag door, the flange portion extending along an edge of the airbag opening, and a hemming part formed by bending the end portion of the flange portion to one side.

2. The air bag structure for an automobile according to claim 1, wherein the hemming part is formed by bending the flange toward the inside of the air bag door by a pressing process.

3. The air bag structure for an automobile according to claim 1, wherein the air bag door includes a reinforcing part to strengthen the air bag door.

4. The air bag door structure for an automobile according to claim 1, wherein a bent length of the hemming part is within a range of 2 to 6 mm.

* * * * *